July 23, 1968

C. G. MATSON 3,393,760

TRACTION UNIT FOR USE WITH SEMI-TRAILERS AND THE LIKE

Filed Oct. 10, 1966

INVENTOR.
CARL G. MATSON

July 23, 1968 C. G. MATSON 3,393,760
TRACTION UNIT FOR USE WITH SEMI-TRAILERS AND THE LIKE
Filed Oct. 10, 1966 2 Sheets-Sheet 2
FIG. 7
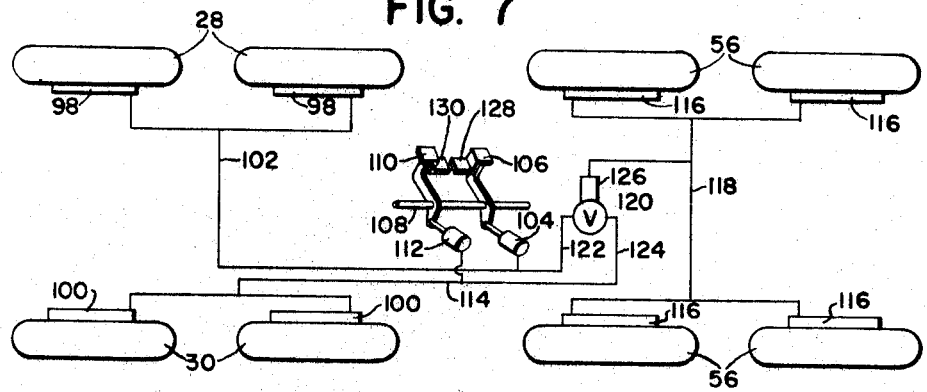
FIG. 8
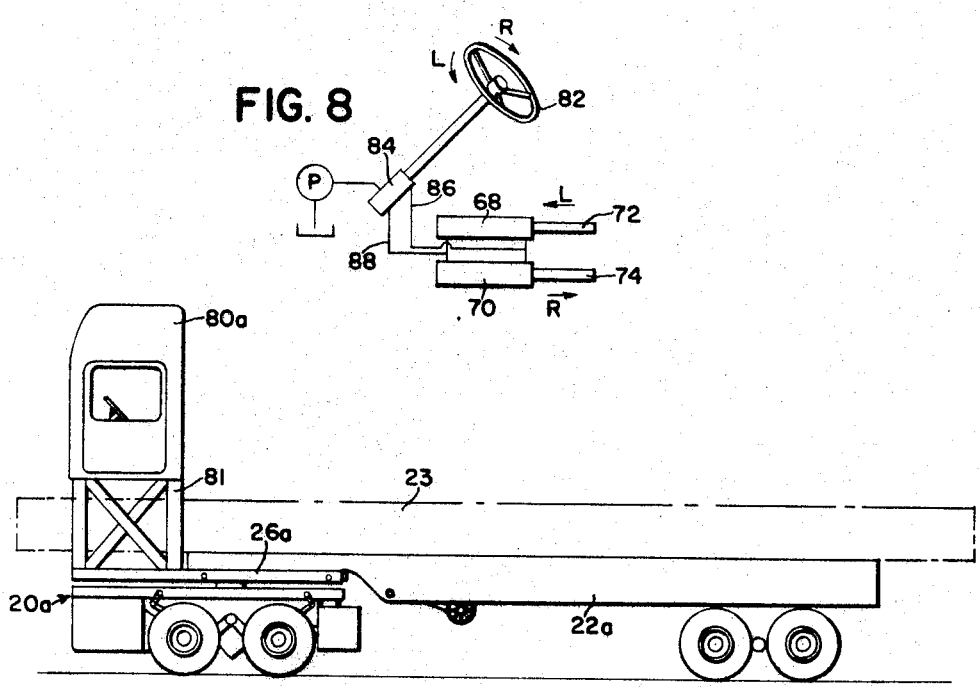
FIG. 9
FIG. 10
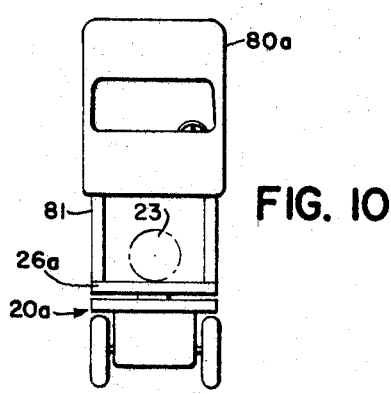
INVENTOR.
CARL G. MATSON

United States Patent Office 3,393,760
Patented July 23, 1968

3,393,760
TRACTION UNIT FOR USE WITH SEMI-TRAILERS AND THE LIKE
Carl G. Matson, 401 E. Central Blvd.,
Kewanee, Ill. 61443
Filed Oct. 10, 1966, Ser. No. 585,592
9 Claims. (Cl. 180—6.64)

ABSTRACT OF THE DISCLOSURE

A traction unit including a carriage supported on fixed-direction, drivably controllable wheels and mounting a cab-carrying frame turnable relative to the carriage about a vertical axis and locable in straight-ahead relation to a semi-trailer to provide a releasably separable vehicle steerable by means operative to turn the carriage and frame relatively and including additional means for drivably controlling the wheels for steering the unit when disconnected from the semi-trailer.

---

It is of course generally conventional to tow and partly support a semi-trailer on a traction unit, commonly called a tractor, which is a unitary self-contained vehicle that differs from an ordinary motor truck, for example, in that it has no cargo body but instead has a fifth wheel or turn-table for supporting the front end of a semi-trailer. In its general similarity to a conventional motor vehicle, the known tractor has steerable front wheels and, whether used with or without the semi-trailer, the steerable front wheels are the sole means for steering either the tractor alone or the vehicular train including the tractor and the semi-trailer. It is a characteristic of the conventional tractor-trailer as just described that it is prone to "jack-knife" because of the inertia of the trailer on quick turns or panic stops, because the tractor steering system is incapable of resisting the forward thrust of the trailer. Moreover, known tractors are of limited power because of the difficulty in giving it enough traction and at the same time enabling it to employ conventional automotive steering and this in turn creates problems of weight distribution, because the greater part of the superimposed weight of the semi-trailer is carried on the rear wheels of the tractor, resulting in a tendency of the front wheels to become relieved of tractor weight under heavy traction conditions and thus to literally lift off the pavement and thus add to the problems of steering the large, heavy and fast-moving rig. This problem is alleviated to some extent by equipping the tractor with tandem rear axles and placing the tractor engine farther forwardly, but the fact remains that the steerable wheels are too lightly loaded. Still further, the operator of a conventional rig sits in a cab that turns with the tractor, so that in the case of a jack-knife he often finds himself transverse to the path of the on-rushing trailer which seldom fails to turn the tractor over as it continues relentlessly forwardly.

It is a principal object of the present invention to provide an improved and novel traction unit usable with or without a semi-trailer but specifically designed for its primary use with such semi-trailer, departing from conventional practices and adapting the tractor for such special use rather than trying to merely add weight and power to a conventional motor truck. This object is achieved by providing the traction unit as a self-contained, self-sustained traction and power vehicle that eliminates conventional automotive steering and that makes the operator's station or a cab a unitary part of the trailer when the tractor and trailer are coupled together.

It is a further and significant object to provide the traction unit as a carriage or bogie having a plurality of wheels, at least one of which is a traction wheel, on which carriage are mounted the necessary components to power and propel same, including the power train and its accessories, and to mount on this carriage, by means of a fifth-wheel or pivot means, a frame that is capacitated to receive, support and be laterally rigidly lockable to the semi-trailer so that such frame becomes a rigid forward prolongation or extension of the trailer, whereby the frame and trailer become a unit pivotable about the fifth-wheel or pivot means relative to the tractionized carriage. The operator's station or cab is mounted on the frame and thus, when the frame is locked to the trailer, becomes a part of the trailer and not a turnable part of the carriage. The cab includes all the controls necessary to operate the combination vehicle, thus making it possible to use trailers of known design, modified only to the extent necessary to adapt same to the releasably lockable means on the tractor frame.

The above design enables the use on the traction unit of heavy-duty traction means such as tandem axles and eliminates the need for conventional automotive steering, since steering of the combination vehicle can be achieved by forces acting on the carriage and reacting on the combined frame-trailer so as to cause the powered carriage and its traction means to turn to either side of a straight-ahead position relative to the frame about the vertical axis of the fifth-wheel or pivotal frame-mounting means. In this respect, it is an object of the invention to provide means for exerting forces between the carriage and frame to accomplish this steering, such means being controllable from the operator's cab. This steering means is not of course used to guide the tractor when it is disconnected from the trailer but it does have a significant function in that, since it tends to turn the trailer-free frame relative to the ground-sustained carriage, it is useful as means for accommodating slight misalinement between the traction and trailer units as the former is backed into the latter preparatory to locking the two together.

Because the traction unit can be provided with heavy-duty carriage-sustaining traction means such as tandem axles with differential drive means, the wheels of these axles can be equipped with conventional brakes but these can be so connected and operated that the left-hand and right-hand brakes are selectively individually operative, which gives adequate controllable steering for use of the traction unit apart from the trailer, in which regard it is contemplated that this system of steering will be used for short runs, maneuvering etc. and not for open highway driving at high speeds. It is a further feature that the braking system may be controlled in such manner that all wheels of the traction unit may be braked simultaneously for straight-ahead stops, and it is a still further feature that this braking system may be tied in with the brakes of the trailer so that all traction-unit and trailer-brakable wheels may be braked in unison. A supplemental feature resides in a means for connecting the tractor and trailer brakes so that they may operate in unison as aforesaid, such means including a coupling from the traction unit brake system to the trailer brake system and a valve operative to insure the unison system while automatically negativing the individual steering-braking system, said valve and coupling being operative, when the trailer is disconnected, to restore the selective braking system of the traction unit.

Another object of the invention is to provide a traction unit in which the operator's station or cab may be elevated to an appreciable height above the frame so as to accommodate extremely long forwardly projecting loads on the trailer, especially in the cases of flat-bed trailers. This is not possible in conventional rigs, because the cab turns with the tractor and not with the trailer; i.e., in the present invention, the cab is mounted on the traction unit frame which is lockable to the trailer and which, as a laterally rigid extension thereof, remains with the trailer as the traction unit carriage, including its wheels, power plant, power train, etc., turns or steers relative to the locked-together frame-cab-trailer unit.

A still further object is to mount all power components on the carriage, including the engine, transmission, brakes, transfer case, fuel tank, radiator etc. wholly independently of the frame and trailer, leaving to the frame the task of carrying the operator's station or cab and the necessary controls, and no modification of the trailer is necessary except, as above stated, the adaptation thereof to the frame-carried locking and unlocking means.

It is of course contemplated that several trailers, modified to the simple extent noted, can be interchangeably used with traction units of the type described.

The foregoing and other important features and significant objects encompassed by and inherent in the invention will become apparent to those skilled in the art as preferred embodiments of the invention are disclosed, by way of example, in the ensuing description and accompanying sheets of drawings, the several figures of which are described below.

FIGURE 7 is a schematic view, showing a representative steering-by-braking means.

FIGURE 8 is a schematic view of a typical steering control system.

FIGURE 9 is a side elevation of a modified form of traction unit and trailer arrangement with an elevated cab.

FIGURE 10 is a front view of the arrangement shown in FIGURE 9.

Figure 1:
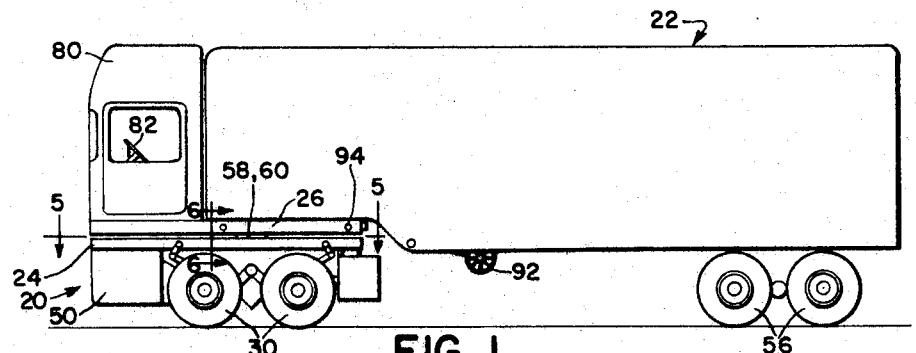
FIGURE 1 is a side elevation of the traction unit and trailer.
Figure 2:
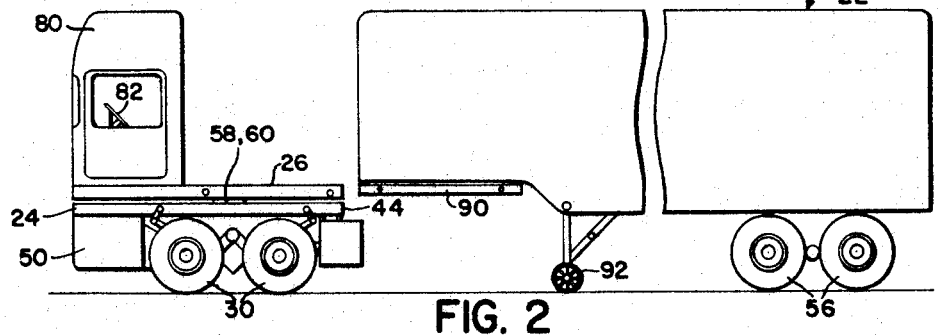
FIGURE 2 is a similar side elevation but showing the traction unit and trailer separated.
Figure 3:
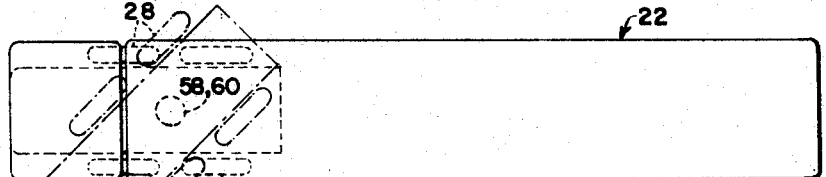
FIGURE 3 is a plan view of the organization shown in FIGURE 1, showing in broken lines one position of the traction unit as turned relative to the trailer.

The vehicular train shown in FIGURES 1-8 includes a traction unit or tractor 20 and a trailer 22, both having somewhat the appearance of the motor truck type of transport media, but it will be understood that both units may be of vastly different types and can still utilize the features of the invention. The tractor 20 is a self-contained, stable vehicle, comprising a fore-and-aft wheeled carriage 24 and a superimposed, carriage-mounted fore-and-aft frame 26, both disposed normally along the line of advance. The carriage has traction means included in a plurality of wheels, which here number four, comprising tandem right hand wheels 28 and tandem left hand wheels 30 constituting part of tandem axle-housing means 32 within which may be conventional differential gearing commonly employed in tandem axle trains. The differential casings for the axles are shown at 34 and the differentials are conventionally interconnected by front and rear propellor shafts 36 and 38 with a transfer case 40 interposed. Drive axles for the rearward wheels 28 and 30 appear at 42 in FIGURE 6. These are details that can be varied within rather wide limits and further illustration is deemed unnecessary, suffice it to say that conventional differential action is obtained between the wheels at opposite sides of the carriage and between the front and rear wheels. Any form of axle suspension may be employed, here again the details being of minor significance. Like typical tandem axles, the wheeled axles here have no vertical pivot axes for steering relative to the carriage per se. In other words, the planes of the wheels 28 and 30 remain parallel to the longitudinal axis of the carriage, which itself is made up of a pair of side rails 44 and several cross members 46 and 48.

The differential gearing, axles, etc., form part of a power train that includes a power plant or engine 50 and transmission 52, the latter being typically of the automatic type or any other kind that lends itself to remote-control operation. In the present instance, the engine is located forwardly and a combination fuel tank and radiator means 54 is located at the rear end of the carriage, supported on the carriage frame 44, 46 in any suitable manner. It is important only that these units, such as the power plant, transmission etc. are parts of the tractor and are totally structurally independent of the trailer. The embodiment selected here for purposes of illustration has the four wheels 28 and 30, all being traction wheels, but it is clear that the number of wheels may be varied so long as the carriage remains stable, and the number of wheels that are driven may also be varied so long as the tractor has sufficient traction for the purposes for which it is intended. The trailer shown here likewise has four wheels 56 (two at each side in tandem) and these are not driven, nor are they per se steerable.

Figures 4, 6:
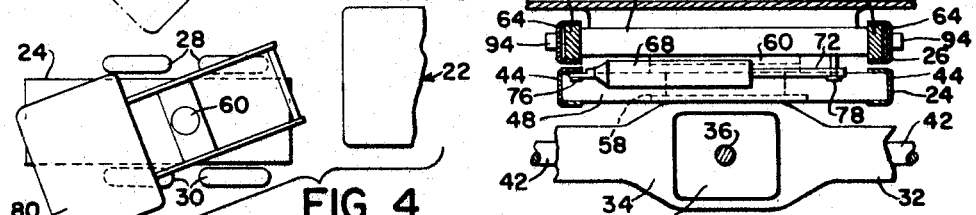
FIGURE 4 is a plan view, with the rear portion of the trailer broken away, showing a position that the traction unit can assume when backing toward the trailer.
FIGURE 6 is an enlarged fragmentary view, partly in section, as seen generally along the line 6—6 of FIGURE 1.
Figure 5:
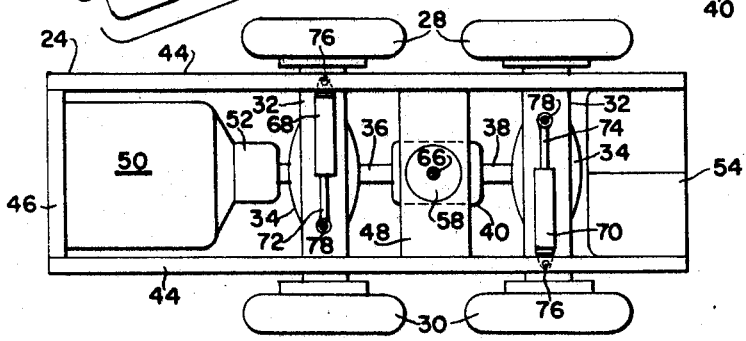
FIGURE 5 is an enlarged view, partly in section, as seen along the line 5—5 of FIGURE 1.

The cross member 48 of the carriage 24 suitably carries thereon the lower half 58 of a turntable or fifth wheel, the upper half 60 of which is coaxially carried by a cross member 62 of the superimposed frame 26 (FIGURE 6), which like the carriage 24 includes opposite fore-and-aft side rails 64, preferably of channel section for purposes to be described later. A center shaft 66 or the like interconnects the fifth wheel halves. The fifth wheel means 58, 60, 66 establishes the vertical axis about which the carriage 24 and frame 26 have relative horizontal swinging movement under control of steering means, preferably of the fluid pressure type and including a pair of oppositely disposed two-way cylinders 68 and 70 and their respective pistons 72 and 74. Each cylinder is connected at 76 to the carriage 24 and each poston is connected at 78 to the respective side rail 64 of the frame 26. The arrangement is such that extension of the pistons turns the frame about the fifth wheel pivot 66 in a counterclockwise direction as seen in FIGURE 5; or, considering the carriage to turn relative to the fixed frame 26, the carriage turns clockwise and effects a right turn. Conversely, contraction of the cylinders and pistons produces a left turn.

The frame 26 carries as a unitary part thereof an operator's station including a cab 80 in which are located the usual controls etc., here including a typical steering wheel 82, the shaft of which is conventionally conneced to a steering valve 84 from which fluid lines 86 and 88 lead to connect opposite ends of the cylinders 68 and 70 in parallel. Any other type of steering system may be employed, but one of the character shown here lends itself to the remote relationship of the cylinders to the steering valve and steering wheel. The fluid system conventionally employs a pump P and other necessary components, the specific illustration of which is deemed unnecessary here.

From the description thus far, it will be clear that the traction unit 20 is a unitary, stable, self-contained vehicle, having its own wheels, power anl train and controls and thus may be run and operated either independently of or with the trailer 22. When the tractor is connected to the trailer, the frame 26 becomes in effect integrated and rigid with the trailer and thus the carriage is turnable relative to the frame-trailer unit about the axis of the fifth wheel 58, 60. In other words, operation of the steering system of FIGURE 8 causes the tractor carriage to turn or steer relative to the trailer, as best shown in broken lines in FIGURE 3. The turnability may be such that the carriage may swing beyond even 90° to either side of its straight-ahead condition (full lines, FIGURE 3). The cab 80, being part of the frame 26, which is in turn at this time a part of the trailer, stays straight ahead.

As described above, the side rails 64 of the frame 26 are channels, and as such they readily adapt themselves to telescopic association with a pair of cooperating fore-and-aft side rails 90 at a lower, fore part of the trailer. When the disconnected tractor is backed toward the trailer, supported on its wheels 56 and extended landing wheels 92 (FIGURE 2), the trailer rails 90 are easily received by the channel rails 64 of the frame, following which any suitable locks 94 may be used to connect the trailer and frame rails. These locks are of course releaseable or removable to allow the tractor to be driven forwardly away from the trailer so as to separate the two.

Because of its differentially driven wheels 28 and 30, the tractor can be steered when it is operating without the trailer. This phase of its steerability is entirely separate from and independent of the FIGURE 8 steering system, for, when the trailer is separated from the carriage, the frame 26 has no companion with which it can serve as the reaction element that causes the carriage to turn relative to the combined trailer and frame, and hence the frame 26 alone turns relative to the carriage when the FIGURE 8 steering system is operated. This nevertheless produces a useful result, because it enables the driver to obtain a better view behind, etc., for example, and because it also aids in manipulating the backing tractor when hitching to the trailer (FIG. 4).

Returning now to the steerability of the tractor as related to its differentially driven wheels 28 and 30: The wheels 28 and 30 respectively have wheel brakes 98 and 100 (FIGURE 7). The brakes 98 are connected by a fluid line system 102 to a master cylinder 104 that is operated by a right hand brake pedal 106 rockable on a cross shaft 108 independently of a left hand pedal 110 that is connected to a left hand master cylinder 112. This cylinder is connected by a fluid line system 114 to the left hand wheel brakes 100. Thus, when the right pedal 106 is depressed, only the right hand wheels 28 are braked by their brakes 98 and the carriage will turn to the right as the left hand wheels 30 drive faster than the wheels 28. Conversely, the left hand pedal 110 is used to brake the left hand wheels 30 for left turns. This is of course an application of the familiar principle of steering by braking and driving but it is useful herein gaining enough maneuverability of the carriage unit alone to permit it to be driven about in local areas, as when moving from one trailer to another, when connecting and disconnecting to and from a trailer and for emergencies.

It is not designed nor intended for high-speed over-the-road travel. As a safety feature, the FIGURE 7 system may be locked out, with the frame 26 and carriage 24 both in straight-ahead positions when the tractor and trailer are separated.

When the tractor and trailer are interconnected, the tractor brakes may be tied in with the trailer brakes, which here include brakes 116 for the wheels 56 and a brake line system 118 that connects these trailer brakes in parallel. The tractor brake system includes a valve 120 to which the tractor wheel brake lines 102 and 114 extend via line extensions 122 and 124 respectively and at which valve 120 the line extensions 122 and 124 are dead-ended during operation of the tractor without the trailer, thus preserving the individual brake control of the tractor right and left hand wheels 28 and 30. However, when the tractor and trailer are connected, the valve 120 is changeable to a condition in which the line extensions 122 and 124 are interconnected, thus iterconnecting the tractor line systems 102 and 114 not only with each other but also with the trailer brake line system 118; placing all brakes in parallel. The valve includes a coupling 126 into which the trailer line 118 may be conveniently plugged, and this coupling may be of a type that automatically changes the value to insure that all line systems 102, 114 and 118 are in parallel. To further augment this phase of operation, the pedals 106 and 110 respectively have coplanar extensions 128 and 130 on which the operator may place his foot to depress both pedals simultaneously and thus obtain equalized braking among all the wheels 28, 30 and 56. This alone is of course not novel, but it is typical of a system that can be employed as part of the present combination. The coupling 126 may also be such that when the line 118 is uncoupled, the valve 120 is restored to its condition in which it separates the tractor brake line system 102–122 and 114–124. These are details that can be varied to suit individual cases.

In the modified form of tractor-trailer unit shown in FIGURES 9 and 10, the numeral 20a designates a traction unit that is in all respects similar to that previously described, with the exception that it has an elevated cab 80a, supported on a stand 81 so that the cab bottom is spaced above the superimposed frame 26a, thus allowing forward extension of long loads, as at 23, that may be carried on the flat bed trailer 22a. If desired, the stand 81 may be furnished as an attachment for the tractor 20 of FIGURES 1–8. The controls from the cab to the brakes, engine, steering etc, can be easily extended to accommodate the elevated position of the cab.

It will be seen from the foregoing that there has been provided a vehicular train in which the traction unit may be integrated with a trailing unit in such manner that the carriage of the former turns for steering relative to the trailer because the traction unit superimposed frame becomes a rigid part of the trailer. Yet, when the two units are disconnected, the traction unit is stable, self-contained and is maneuverable by a steering system separate from that employed when the tractor and trailer are connected. The application of this principle to many forms of tractor-trailer units will become apparent to those versed in the art, as will many other variations and modifications on the basis of what is disclosed here, all without departure from the spirit and scope of the appended claims.

What is claimed is:

1. A traction unit operative selectively in conjunction with and separately from a semi-trailer, comprising: a fore-and-aft carriage; traction means including a plurality of fixed-direction wheels stably supporting and for propelling said carriage; a power train on said carriage and drivingly connected to said traction means; a normally fore-and-aft frame superimposed over said carriage and having a rear end portion including laterally spaced transversely aligned connection means adapted to receive and support the forward end of a semi-trailer; releasable locking means on said rear end portion and adapted to cooperate with the forward end of a semi-trailer for locking said frame thereto as a laterally rigid forward extension thereof; mounting means sustaining said frame on said carriage and including a vertical pivot axis spaced forwardly of said connection means and about which said frame is angularly movable relative to said carriage when said unit is separate from a semi-trailer and about which said carriage is angularly movable relative to the locked-together frame and semi-trailer when said unit and semi-trailer are used in conjunction; an operator's station on said frame; and force-exerting means controllable from said operator's station and connected between said frame and carriage for turning the two relatively about said axis so as to selectively turn said carriage angularly to either side of a straight-ahead position relative to the locked-together frame and semi-trailer whereby to steer the combined tractor and semi-trailer.

2. The invention defined in claim 1, in which: said operator's station is carried by a forward end portion of said frame and independently of a semi-trailer so as to lie directly ahead of a semi-trailer when the latter is locked to said frame.

3. The invention defined in claim 1, in which: at least a pair of said fixed-direction wheels are drivably controllable to steer said carriage when separated from a semi-trailer, and further means, additional to said force-exerting means, is located at said operator's station and is operative to drivably control said pair of fixed-direction wheels.

4. The invention defined in claim 3, in which: said pair of traction wheels respectively include individual brakes, said power train includes drive means differentially connecting said pair of traction wheels, and said further means includes a pair of individual brake control means connected to said brakes for selectively operating either brake during differential driving of said pair of traction wheels whereby to steer said traction unit when it is disconnected from a semi-trailer.

5. The invention defined in claim 4, in which: said brakes are also selectively operative in unison to apply both brakes simultaneously.

6. The invention defined in claim 4, in which: said unit is connectible to a semi-trailer having transversely spaced wheels including brakes, and said brake means of said unit includes means for releasable connection to such semi-trailer brakes, and means is provided for causing all brakes to operate in unison for straight-ahead braking of the combined traction unit and semi-trailer.

7. The invention defined in claim 1, in which the wheels supporting said carriage are driven by differentially driven tandem axle means and include right- and left-hand pairs of wheels, each wheel has a brake and said brakes for said right- and left-hand wheels are respectively connected in right- and left-hand pairs, and a pair of individual brake control means is located at said operator's station and connected to said right- and left-hand brake pairs for selectively operating either brake pair during differential driving of said traction wheels whereby to steer the traction unit when it is disconnected from a semi-trailer.

8. The invention defined in claim 1, in which: said operator's station is a cab structure adapted to be snugly associated with and ahead but independent of a semi-trailer when said traction unit and a semi-trailer are locked together.

9. The invention defined in claim 1 in which: said frame has front and rear extensions respectively forwardly and rearwardly beyond said carriage and said extensions carry parts of and accessories for said power train.

References Cited

UNITED STATES PATENTS

| | | | |
|---|---|---|---|
| 2,233,192 | 2/1941 | Armington | 180—6.2 XR |
| 2,291,626 | 8/1942 | Huber | 180—14 |
| 2,374,196 | 4/1945 | Harbers | 180—6.2 |
| 2,380,181 | 7/1945 | Krewzien | 180—6.2 |
| 3,075,604 | 1/1963 | Barenyi | 180—89 |
| 3,181,887 | 5/1965 | Boylan et al. | 280—421 |

FOREIGN PATENTS 620,126  3/1949  Great Britain.

BENJAMIN HERSH, *Primary Examiner.*

L. D. MORRIS, JR., *Assistant Examiner.*